Sept. 4, 1956  C. C. PECK  2,761,395
PRECISION TRACKWAY AND CARRIAGE
Filed July 26, 1952  2 Sheets-Sheet 1

INVENTOR.
CECIL C. PECK
BY
Oberlin + Limbach
ATTORNEYS.

Sept. 4, 1956          C. C. PECK          2,761,395

PRECISION TRACKWAY AND CARRIAGE

Filed July 26, 1952          2 Sheets—Sheet 2

INVENTOR.
CECIL C. PECK
BY
Oberlin & Limbach
ATTORNEYS

United States Patent Office 2,761,395
Patented Sept. 4, 1956

2,761,395

PRECISION TRACKWAY AND CARRIAGE

Cecil C. Peck, Euclid, Ohio, assignor to Cecil C. Peck Company, Cleveland, Ohio, a corporation of Ohio Application July 26, 1952, Serial No. 301,150

4 Claims. (Cl. 104—246)

This invention relates, as indicated, to a precision trackway and carriage, and more particularly to a trackway including a pair of spaced rail elements and an associated travel carriage adapted to be accurately supported upon and guided along such rail elements.

The movement of a carriage along a pair of rails is influenced by several forces other than the carriage propelling force which cause such movement to depart from the straight-line, uniplanar motion often necessary or desired. Thus, there is the tendency of the rails and/or the rail supports to sag or deflect under the weight of the carriage load, the inclination of the carriage to shift laterally, and the tendency of the carriage to move vertically relative to the rails, particularly during acceleration and deceleration and where the load is relatively heavy. The rocking or swaying motion produced by these forces and others of a more complex nature imposes serious limitations upon the use of this comparatively simple and economic apparatus, as it is presently known, in many fields, notably the automatic machine tool field, wherein the carriage movement must be precisely controlled. For example, in many automatic welding operations it is necessary not only that the welding head be flexibly mounted relative to a support point but that such point itself be movably mounted with respect to the work piece. Since the efficiency of the welding operation is dependent upon the accuracy with which the welder is caused to follow the prescribed path, it is obvious that the mobile tool support must be such as to prevent any deviations from this path. The need for precise control in this and other similar instances often cannot be satisfied with conventional trackway and carriage apparatus, with the result that more complex and expensive structure must be resorted to.

It is accordingly a primary object of my invention to provide a trackway and carriage wherein the carriage is precisely supported upon the trackway and prevented from deviating from the desired travel path. It is a further object of my invention to provide a precision trackway including a pair of spaced rail elements wherein such elements are rigidly supported throughout substantially their entire extent to inhibit deflection thereof under load. Another object of my invention is to provide a combined trackway and travel carriage structure wherein the carriage is restrained from moving laterally relative to the trackway. A further object of my invention is to provide an interengaged trackway and carriage wherein the carriage is effectively prevented from moving in any direction other than along the trackway. It is an additional object of my invention to provide a precision trackway composed of a plurality of individual removably aligned track sections, thereby enabling the trackway length to be varied. Other objects and advantages of the invention will become apparent as the following description proceeds.

To the accomplishment of the foregoing and related ends, said invention, then, consists of the means herein-after fully described and particularly pointed out in the claims.

The annexed drawings and the following description set forth in detail certain structure embodying the invention, such disclosed means constituting, however, but one of various structural forms in which the principle of the invention may be used.

Figure 1:
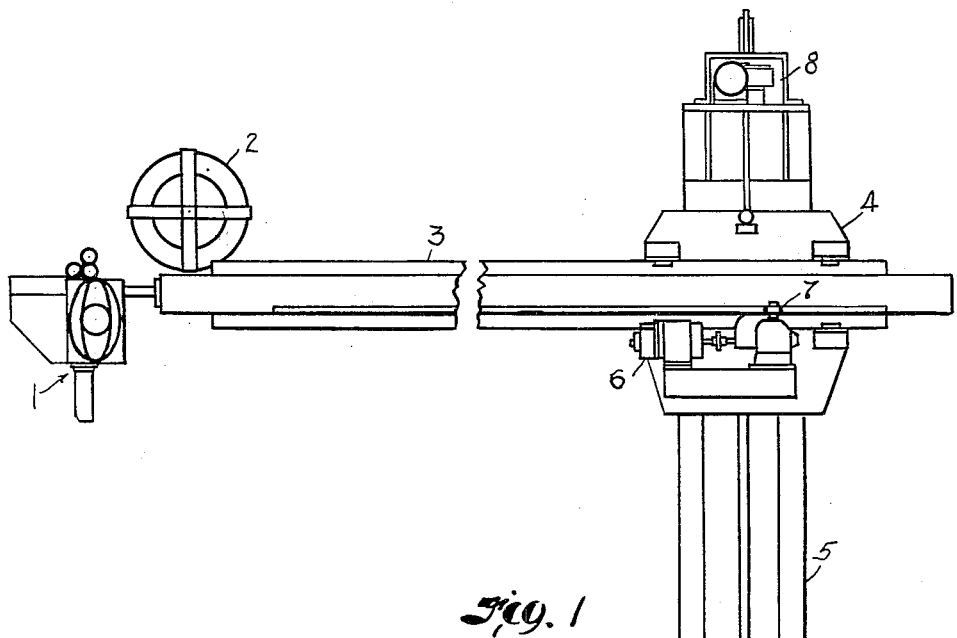
Fig. 1 is an end elevation of my trackway and carriage supporting an automatic welding machine.

Referring now to the drawings for purposes of illustration and in particular to Fig. 1, my invention is there shown in operative association with an automatic ram type welder. The utility of the invention may be demonstrated by considering this prime application thereof, however, since the welding apparatus itself does not constitute a part of the instant invention, it will be described only generally.

The ram type welder depicted comprises a welding head indicated at 1 provided with means in the form of a spool 2 for supplying a continuous electrode thereto. These elements are located at the outer extremity of a boom or ram 3 which is horizontally supported by a carriage member 4 adapted to travel up and down a column or mast 5. The carriage member 4 is provided with a ram drive motor 6 operative to reciprocate the ram transversely of the mast 5 through a suitable mechanism such as a rack and pinion arrangement 7 while the vertical travel of the carriage member may be controlled by a cable hoist means such as shown generally at 8. To permit the welding head to be angularly displaced as well as moved vertically and horizontally, the mast 5 is mounted upon a turntable 9 which may be rotated by any known means suitable for the purpose. If the structure thus far described is maintained at a fixed location, it will be apparent that no particular difficulty will be experienced in supporting the same despite its obvious instability since adequate permanent attachment may be made to the floor or ground. It will be equally apparent, however, that the flexibility of the welder is materially limited in such an arrangement, and it is therefore desirable that the mast 5 be movably mounted so that it may be moved relative to a stationary work piece. With this added degree of movement a great many more applications of the welder may be realized, for example, it is ideally suited for the welding of longitudinal seams in tubing, elongated vessels and the like. In such instances, a work piece is disposed to either side of the mast 5 with the seams to be welded parallel to each other and the welding head 1 adjusted vertically and horizontally to the proper position for welding one such seam. The mast 5 is then moved between the pieces to lay one desired weld, and upon completion thereof, the mast is rotated 180 degrees and the direction of its movement reversed whereby the second work piece may be welded in the return travel of the welder. While such second piece is being welded, the first may be removed and replaced by another, thereby enabling the welder to be continuously operated. The movement of the mast 5 in this manner must obviously be precisely controlled.

Figure 2:
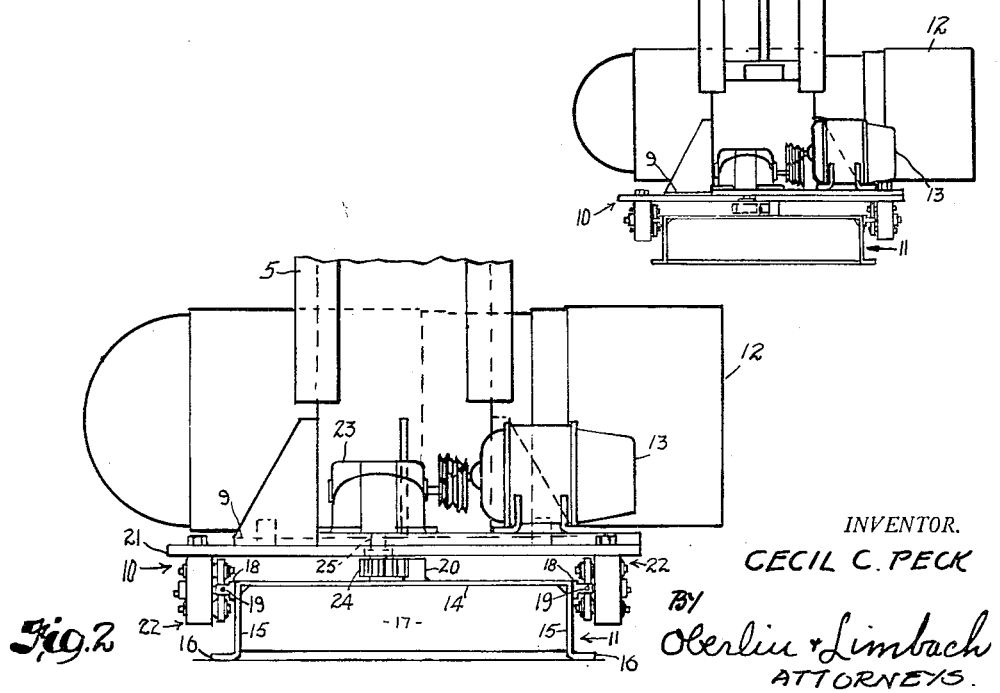
Fig. 2 is a broken view of the Fig. 1 apparatus on a larger scale.
Figure 3:
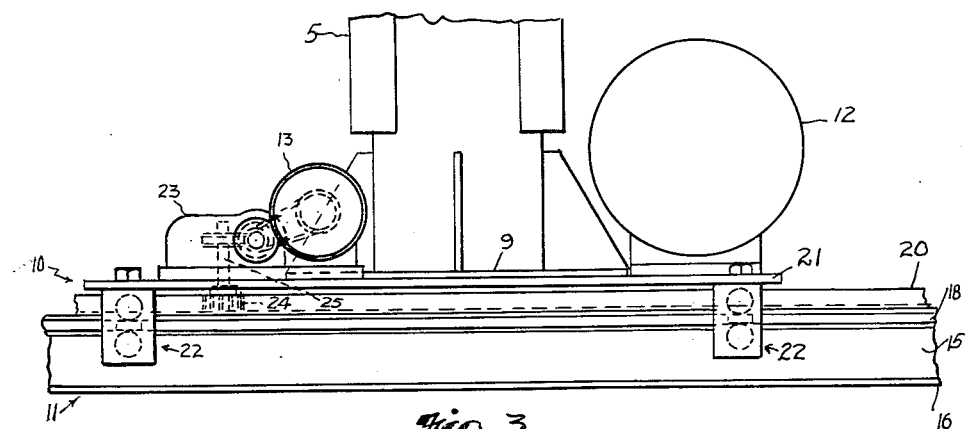
Fig. 3 is a side elevation of the trackway and carriage as shown in Fig. 2.

In the use of my invention with such apparatus, the turntable 9 supporting mast 5 is mounted upon a travel carriage indicated generally at 10 which is movably supported on a precision trackway generally designated by the numeral 11. The welding generator 12 for supplying welding current is also mounted on the carriage 10 as is the motor 13 for driving the carriage along the trackway. For ease of description, the carriage and trackway as shown in Fig. 1 are reproduced on a larger scale in Fig. 2, to which reference is now made.

The trackway 11 in accordance with my invention is of inverted channel shape having a horizontally disposed main portion 14 and vertically depending parallel side portions 15. Such channel is preferably formed by bending a steel plate to the desired shape and providing it with mounting flanges 16 at the respective extremities of the side portions 15. The channel may be strengthened by the addition of stiffening partitions 17 at spaced intervals therealong. Secured lengthwise, for example as by welding, to the upper outside edges of the respective channel side portions 15 are the rail elements 18 adapted to support and guide the travel carriage 10. The end faces of these rail elements are recessed as shown at 19 for a purpose to be described hereinbelow. Also secured as by welding to the channel structure is a rack element 20 longitudinally disposed on the upper surface of the horizontal channel portion 14.

The travel carriage 10 supported by the rail elements 18 comprises a platform 21 of generally rectangular shape upon which the members to be moved are mounted. Anti-friction engagement with the rail elements is obtained by means of identical roller units indicated generally at 22 secured to the underside of platform 21. It is preferred for purposes of stability that four such units be employed, respectively located in the corner areas of the platform. Carriage drive motor 13 is connected by pulley means to a conventional gear reduction assembly 23 which has a pinion gear 24 attached to its output shaft 25. Pinion 24 is disposed to mesh with the rack 20 fixedly supported on the trackway channel thereby causing the carriage to move when such pinion is driven. The speed and direction of the drive of motor 13 are controlled by suitable means of conventional variety not shown.

Figure 4:
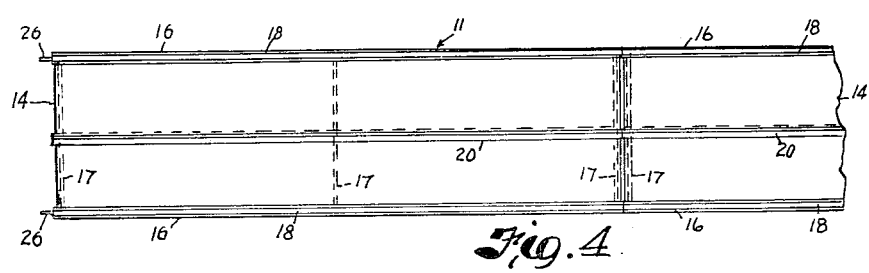
Fig. 4 is a view in plan of a segment of the trackway.

As stated, the rail elements 18 are secured lengthwise to the channel side portions 15, and they are therefore maintained in spaced apart, parallel relation. Although the channel and rail elements could obviously extend the entire length of trackway desired, it is preferred to use a plurality of track sections of lesser extent so that the total length may be varied as dictated by specific applications. These individual sections are identical and each comprises a channel structure, a pair of rail elements, and a rack element as previously described. In Fig. 4 two such track sections are shown with one broken away, and obviously any desired number of sections may be removably disposed in aligned relation in the manner illustrated. It will appear from this view that each channel is of substantially the same length as its associated rail elements 18. Since the rail elements, and also each rack element 20, do however project slightly beyond the respective channel ends, the contact between adjacent track sections is achieved through the meeting end faces of the several rail and rack elements. The end faces of rail elements 18 are ground to provide true surfaces and therefore an accurate and close joint at the points of contact. To further insure that the adjacent rail elements remain in proper alignment, the end faces thereof may be recessed as at 19, previously mentioned, for the reception of interfitting pins or dowels 26.

It will be appreciated that the trackway constructed in the manner described will rigidly support the rail elements 18 throughout substantially their entire extent and therefore inhibit any tendency of such elements to sag or deflect under load. Furthermore, the load applied to the channel side portions 15 will be in a generally edgewise direction thus effectively eliminating any flexure of the rail support means. In practice, the trackway is preferably levelled upon and bolted by means of bolts overlapping channel side flanges 16 to a level steel supporting frame either on or in the floor, with the cumulative result that the travel carriage 10 will be precisely supported and guided in its movement along the trackway.

Figure 5:
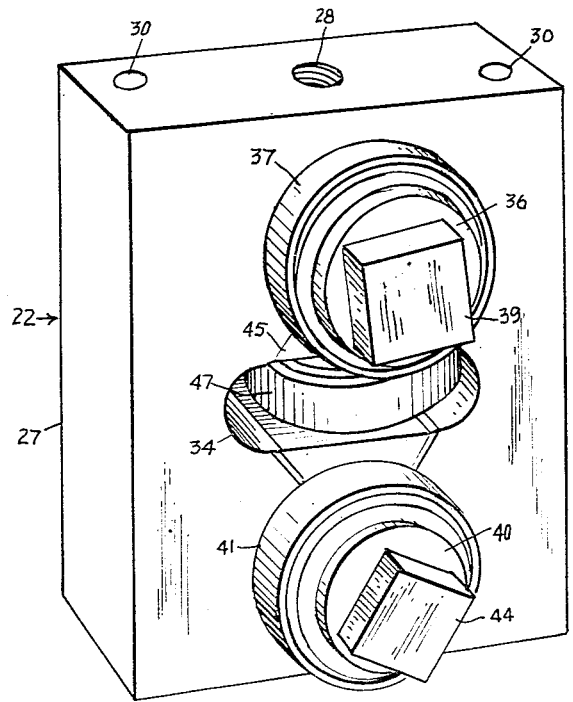
Fig. 5 is a perspective view of the roller unit used to interlock the carriage and trackway.
Figure 6:
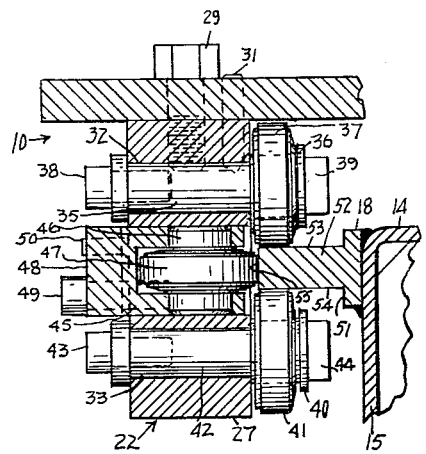
Fig. 6 is a vertical section of the roller unit showing also the manner in which it is secured to the carriage platform and engages the trackway rail.

The specific manner in which the travel carriage is supported in accordance with my invention will be readily understood from a consideration of Figs. 5 and 6 wherein the detailed construction of one roller unit 22 and its operative relation to the carriage 10 and trackway 11 are illustrated. Since the plural roller units employed are identical, a detailed description of one is believed sufficient. Roller unit 22 as shown comprises a solid block 27 having a tapped recess 28 in its top surface whereby it may be secured to the underside of the carriage platform 21 by means of a screw 29 passing through the platform. The top of block 27 may also be recessed as at 30 at diagonally opposite corners for the reception of dowels, one of which is shown at 31 in Fig. 6, projecting through the platform 21. Dowels located in this manner will prevent the block from swivelling about its point of connection to the carriage platform.

The block 27 is further provided with parallel bores 32 and 33, vertically aligned in spaced apart relation, and a central passage 34 located between said bores, all extending between the front and rear block faces. Uppermost bore 32 receives the shank 35 of a shaft member 36 having a roller 37 mounted thereon. The roller 37 is of conventional type, preferably having sealed bearings, and will freely rotate in a vertical plane about the axis of shaft member 36. Shank 35 at its free end is flush with the back of block 27 and internally threaded to engage with a screw locking member 38. To facilitate assembly of these elements, shaft member 36 may be provided with a square boss 39 at its end away from the block 27. The lower bore 33 supports a shaft member 40 upon which is mounted a second roller 41. This lower roller assembly is the same as the upper assembly described and comprises a shank 42, locking member 43 and boss 44 similar to the corresponding elements of such upper assembly. Disposed within the central passage 34 is a shaft supporting member in the form of a slotted cylinder 45 with the slot thereof lying in a horizontal plane. The legs of such slotted cylinder support a vertical shaft 46, and mounted on this shaft is a third roller 47 of the same nature as rollers 37 and 41. It is to be noted that roller 47 rotates in a horizontal plane about an axis normal to and between the parallel axes of rollers 37 and 41. The slotted cylinder 45 is attached to a cross plate 48 which is arranged on the back of block 27 across the opening of passage 34 and held in place by suitable means such as the screws 49 and 50 threaded into the block at the sides of such opening.

As shown best in Fig. 6, rail element 18 comprises a base portion 51, which is secured to the channel side portion 15, and a longitudinal projection 52 directed laterally outwardly from the channel side to provide a top horizontal rail surface 53, a bottom horizontal rail surface 54 and an outboard vertical rail surface 55. The horizontal rail surfaces 53 and 54 are parallel to each other and the vertical rail surface 55 normal to and between such parallel surfaces, with all rail surfaces of course extending the length of the rail element. Rollers 37, 41 and 47 are so disposed as to engage respectively the rail surfaces 53, 54 and 55, which are preferably machined to provide accurate rail-treads. It will be understood that each rail element 18 of the trackway has these described characteristics and that each roller unit 22 to co-acts with such rail elements in the manner here set forth in detail.

Considering the described trackway and carriage structure in its entirety, it is clear that the several upper rollers 37 will support the carriage weight on the top rail surfaces 53 and that lower rollers 41 will prevent the carriage from moving vertically relative to the trackway by their engagement with the bottom rail surfaces 54. Since the longitudinal projections 52 of the pair of rail elements 18 are each directed outwardly of the trackway channel, and hence in opposite horizontal directions, it will be also clear that the carriage cannot shift laterally on the trackway due to the rollers 47 contacting the respective outboard rail surfaces 55. As a result, it may be said that my trackway and carriage are so interlocked that the carriage is effectively restrained from movement in all directions other than that of the desired travel. My invention is therefore well adapted to meet the need for precision movement in the welding application discussed above, and obviously it may be used to advantage in other instances of article handling or work treating apparatus where precise relative motion is necessary or desired.

There may be some instances where the degree of precision required is such that the slightest lack of parallelism between the respectively opposed machined rail surfaces at any point along the length thereof, owing possibly to imperfect machining or wear, would be objectionable. In such cases, certain of the rollers may be resiliently mounted by any suitable known means, for example, by a spring mounting of the roller element on its shaft, spring biasing the shaft itself in the direction of roller contact, or supporting the shaft in a rubber sleeve, and preferably the two lower rollers and one side roller of each transverse pair of roller units will be so mounted. Each pair of opposed rollers would therefore include a resilient support effectively preventing any loss of contact or undue friction in both the vertical and horizontal roller engagement with the rails.

Other modes of applying the principle of the invention may be employed, change being made as regard the details described, provided the features stated in any of the following claims or the equivalent of such be employed.

I therefore particularly point out and distinctly claim as my invention:

1. In apparatus of the character described, in combination, a pair of elongated rail elements each having a flat base and a longitudinally extending projection which forms two spaced planar parallel rail surfaces and a third outer planar rail surface normal to and between such parallel surfaces, a channel-shaped support for said rail elements of substantially the same length as the latter and including vertically disposed parallel side walls, the rail elements being arranged and secured to said support with their flat bases uniformly overlying the respective side walls of the same and their longitudinal projections extending laterally in opposite directions, said rail elements and support thereby forming a trackway having discrete planar top and bottom and outboard rail surfaces at each side of the trackway, a carriage comprising a generally rectangular platform disposed above the thus supported rail elements and of a width such to bridge the same, and a roller assembly attached to and depending from said platform in each corner region thereof, each such assembly mounting in fixed relation to one another upper and lower rollers engaged with the top and bottom rail surfaces respectively of one of the rail elements and a third roller engaged with the outboard rail surface of such element, the carriage thereby being supported on the trackway for movement therealong, the several pairs of top and bottom rollers restraining the carriage from moving vertically relative to the trackway and the rollers engaged with the outboard rail surfaces in opposition at the respective sides of the carriage affording positive restraint of the carriage against lateral movement on the rails.

2. In apparatus of the character described, in combination, a pair of elongated rail elements each having a flat base and a longitudinally extending projection which forms two spaced planar parallel rail surfaces and a third outer planar rail surface normal to and between such parallel surfaces, a support of inverted channel shape for said rail elements of substantially the same length as the latter, the rail elements being arranged and secured to said support with their flat bases uniformly overlying the outer surfaces of the respective side walls thereof and their longitudinal projections extending laterally outwardly in opposite directions, said rail elements and support thereby forming a trackway having discrete planar top and bottom and outboard rail surfaces at each side of the trackway, a carriage comprising a generally rectangular platform disposed above the thus supported rail elements and of a width such to bridge the same, and a roller assembly attached to and depending from said platform in each corner region thereof, each such assembly mounting in fixed relation to one another upper and lower rollers engaged with the top and bottom rail surfaces respectively of one of the rail elements and a third roller engaged with the outboard rail surface of such element, the carriage thereby being supported on the trackway for movement therealong, the several pairs of top and bottom rollers restraining the carriage from moving vertically relative to the trackway and the rollers engaged with the outboard rail surfaces in opposition at the respective sides of the carriage affording positive restraint of the carriage against lateral movement on the rails.

3. In apparatus of the character described, in combination, a pair of elongated rail elements each having a flat base and a longitudinally extending projection which forms two spaced planar parallel rail surfaces and a third outer planar rail surface normal to and between such parallel surfaces, a channel-shaped support for said rail elements of substantially the same length as the latter and including vertically disposed parallel side walls, the rail elements being arranged and secured to said support with their flat bases uniformly overlying the respective side walls of the same and their longitudinal projections extending laterally in opposite directions, said rail elements and support thereby forming a trackway having discrete planar top and bottom and outboard rail surfaces at each side of the trackway, a carriage comprising a generally rectangular platform disposed above the thus supported rail elements and of a width such to bridge the same, and a roller assembly attached to and depending from said platform in each corner region thereof, each such assembly mounting in fixed relation to one another upper and lower rollers engaged with the top and bottom rail surfaces respectively of one of the rail elements and a third roller engaged with the outboard rail surface of such element, the axes of the three rollers of each such assembly being disposed in substantially the same plane, the carriage thereby being supported on the trackway for movement therealong, the several pairs of top and bottom rollers restraining the carriage from moving vertically relative to the trackway and the rollers engaged with the outboard rail surfaces in opposition at the respective sides of the carriage affording positive restraint of the carriage against lateral movement on the rails.

4. In apparatus of the character described, in combination, a pair of elongated rail elements each having a flat base and a longitudinally extending projection which forms two spaced planar parallel rail surfaces and a third outer planar rail surface normal to and between such parallel surfaces, a support of inverted channel shape for said rail elements of substantially the same length as the latter, the rail elements being arranged and secured to said support with their flat bases uniformly overlying the outer surfaces of the respective side walls thereof and their longitudinal projections extending laterally outwardly in opposite directions, said rail elements and support thereby forming a trackway having discrete planar top and bottom and outboard rail surfaces at each side of the trackway, a carriage comprising a generally rectangular platform disposed above the thus supported rail elements and of a width such to bridge the same, and a roller assembly attached to and depending from said platform in each corner region thereof, each such assembly mounting in fixed relation to one another upper and lower rollers engaged with the top and bottom rail surfaces respectively of one of the rail elements and a third roller engaged with the outboard rail surface of such element, the axes of the three rollers of each such assembly being disposed in substantially the same plane, the carriage thereby being supported on the trackway for movement therealong, the several pairs of top and bottom rollers restraining the carriage from moving vertically relative to the trackway and the rollers engaged with the outboard rail surfaces in opposition at the respective sides of the carriage affording positive restraint of the carriage against lateral movement on the rails.

References Cited in the file of this patent

UNITED STATES PATENTS

| | | |
|---|---|---|
| 671,521 | Lang | Apr. 9, 1901 |
| 1,728,726 | Fink | Sept. 17, 1929 |
| 2,166,752 | Cullen | July 18, 1939 |
| 2,481,421 | Hayes | Sept. 6, 1949 |